US005566068A

United States Patent [19]
Comer et al.

[11] Patent Number: 5,566,068
[45] Date of Patent: Oct. 15, 1996

[54] METHOD AND SYSTEM FOR LOCATING FIELD BREAKS WITHIN INPUT DATA

[75] Inventors: Ross W. Comer, Bellevue; Cynthia A. Solomon, Bothell, both of Wash.

[73] Assignee: Microsoft Corporation, Redmond, Wash.

[21] Appl. No.: 122,891

[22] Filed: Sep. 15, 1993

[51] Int. Cl.$^6$ .................................................. G06F 17/27
[52] U.S. Cl. ........................ 364/419.19; 364/419.17; 395/148; 395/600
[58] Field of Search ............................ 395/148, 144, 395/145, 600, 149; 364/715.03, 419.1, 419.15, 419.17, 419.19

[56] References Cited

U.S. PATENT DOCUMENTS

| | | | |
|---|---|---|---|
| 4,225,943 | 9/1980 | Busch | 364/DIG. 2 X |
| 4,484,826 | 11/1984 | Horn et al. | 400/279 |
| 4,491,933 | 1/1985 | Ursin et al. | 395/148 |
| 4,559,614 | 12/1985 | Peek et al. | 364/DIG. 2 X |
| 4,604,710 | 8/1986 | Amezcua et al. | 364/DIG. 2 X |
| 4,686,649 | 8/1987 | Rush et al. | 395/148 |
| 5,018,077 | 5/1991 | Healeg | 395/148 |
| 5,055,998 | 10/1991 | Wright et al. | 395/800 |
| 5,280,575 | 1/1994 | Young et al. | 395/148 |
| 5,333,252 | 7/1994 | Brewer, III et al. | 395/148 |

OTHER PUBLICATIONS

M. Steven Baker, "Converting Database Files Using Filters," *Programmer's Journal*, vol. 7, No. 3, pp. 56–60, 1989.
"Tolerant Database Import Utility," *IBM Technical Disclosure Bulletin*, vol. 31, No. 11, p. 31, Apr. 1989.
"Justification Approach for a Two Pass Printer Text Formatter," *IBM Technical Disclosure Bulletin* vol. 24, No 8, pp. 4136–4138, Jan. 1982.
"Foreign Column Specification for Database Import/Export," *IBM Technical Disclosure Bulletin*, vol. 31, No. 10, p. 313, Mar. 1989.
Douglas F. Cobb, "Running Microsoft Excel," Microsoft Press, 1988, pp. 98–100; 681–683.
"Lotus 1-2-3 for Windows Release 1.0," *Lotus User's Guide*, 1991.
*Quattro Pro for Windows User's Guide*, 1987, pp. 364–370.
"Relational Database Management System for Windows," *Microsoft Access User's Guide*, 1992, pp. 78–81.
"Spreadsheet with Business Graphics and Database Version 4.0 for Apple, Macintosh Series or Windows Series," *Microsoft Excel User's Guide* 2, 1992, pp. 150–151.

*Primary Examiner*—Paul V. Kulik
*Attorney, Agent, or Firm*—Seed and Berry LLP

[57] ABSTRACT

A method and system for locating field breaks within input data is provided. In a preferred embodiment, a software facility locates field breaks within input data. The facility first receives input data made of a large number of rows of text. The facility then selects a group of the received rows of text to analyze. The facility identifies field breaks within the input data by analyzing the selected group of rows of text. The facility preferably analyzes the selected rows by counting the number of substantive characters in each column of the selected rows. The facility then uses the count to determine which columns have less than a field-break threshold of substantive characters. The facility locates one field break within each series of columns that have less than the field-break threshold of substantive characters.

41 Claims, 12 Drawing Sheets

| | 131 | 132 | 133 | 134 | 135 | 136 | 137 |
|---|---|---|---|---|---|---|---|
| 101 | 004234 | control cable (inches) | 115 | Cindy | $.50 | $5.75 | 12/6/93 |
| 102 | 121212 | antilock brake units | 4 | Ann | $375.00 | $1500.00 | 1/7/94 |
| 103 | 125402 | spoiler | 1 | Roger | $50.00 | $500.00 | 2/1/94 |
| 104 | 200009 | 65 hp. engine | 1 | Al | $450.00 | $450.00 | 12/27/93 |
| 105 | 221122 | heavy duty bumpers | 2 | Ty | $120.00 | $240.00 | 12/2/94 |
| 106 | 234102 | titanium-cone speakers | 4 | Ann | $200.00 | $800.00 | 1/7/94 |
| 107 | 284782 | body | 1 | Ann | $225.00 | $225.00 | 11/28/94 |
| 108 | 345353 | traction control senso | 4 | Al | $720.00 | $2880.00 | 1/16/94 |
| 109 | 412344 | tractor transmission | 1 | Ty | $275.00 | $275.00 | 1/30/94 |
| 110 | 534523 | steering carriage | 1 | David | $75.00 | $75.00 | 11/30/93 |
| 111 | 560000 | seat belt | 2 | Cindy | $25.00 | $50.00 | 12/16/93 |
| 112 | 663661 | axles | 2 | Sue | $215.00 | $430.00 | 12/16/93 |
| 113 | 747474 | steering wheel | 1 | Roger | $30.00 | $30.00 | 2/3/94 |
| 114 | 746744 | CD changer | 1 | Al | $550.00 | $550.00 | 2/15/94 |
| 115 | 787686 | mag wheels | 4 | Gina | $40.00 | $160.00 | 1/12/94 |
| 116 | 846262 | bucket seat | 1 | Gina | $75.00 | $75.00 | 2/1/94 |
| 117 | 876543 | pedals | 2 | Roger | $15.00 | $30.00 | 12/26/93 |
| 118 | 934456 | valve stems | 4 | Cindy | $.10 | $.40 | 2/7/94 |
| 119 | 982528 | frame | 1 | Ann | $200.00 | $200.00 | 11/28/94 |
| 120 | 999999 | racing slicks | 4 | Al | $175.00 | $700.00 | 12/9/93 |

FIG. 1

Prior Art

```
0000000000111111111122222222223333333333444444444455555555556666666
1234567890123456789012345678901234567890123456789012345678901234567                    201

004234 control cable (inches)115 Cindy   $.05       $5.75  12/6/93
121212 antilock brake units       4 Ann  $375.00  $1500.00  1/7/94
125402 spoiler                    1 Roger $50.00   $500.00  2/1/94
200009 65 hp. engine              1 Al   $450.00   $450.00 12/27/93
221122 heavy duty bumpers         2 Ty   $120.00   $240.00 12/2/94
234102 titanium-cone speakers     4 Ann  $200.00   $800.00  1/7/94
284782 body                       1 Ann  $225.00   $225.00 11/28/94
345353 traction control senso     4 Al   $720.00  $2880.00  1/16/94
412344 tractor transmission       1 Ty   $275.00   $275.00  1/30/94
534523 steering carriage          1 David $75.00    $75.00 11/30/93
560000 seat belt                  2 Cindy $25.00    $50.00 12/16/93
663661 axles                      2 Sue  $215.00   $430.00 12/16/93
747474 steering wheel             1 Roger $30.00    $30.00  2/3/94
746744 CD changer                 1 Al   $550.00   $550.00  2/15/94
787686 mag wheels                 4 Gina  $40.00   $160.00  1/12/94
846262 bucket seat                1 Gina  $75.00    $75.00  2/1/94
876543 pedals                     2 Roger $15.00    $30.00 12/26/93
934456 valve stems                4 Cindy  $.10      $.40   2/7/94
982528 frame                      1 Ann  $200.00   $200.00 11/28/94
999999 racing slicks              4 Al   $175.00   $700.00 12/9/93
```

FIG. 2

Prior Art

Prior Art

```
0000000 0011111111122222222223333333344 4444444455 5555555 6666666
1234567 8901234567890123456789012345678901 2345678901 3456789 0123456

004234  control cable (inches) 115 Cindy      $.05    $5.75    12/6/93
121212  antilock brake units    4 Ann  $37   5.00 $15 00.00  1/7/94
125402  spoiler                 1 Roger $5   0.00  $5 00.00  2/1/94
200009  65 hp. engine           1 Al   $45   0.00  $4 50.00 1 2/27/93
221122  heavy duty bumpers      2 Ty   $12   0.00  $2 40.00   12/2/94
234102  titanium-cone speakers  4 Ann  $20   0.00  $8 00.00  1/7/94
284782  body                    1 Ann  $22   5.00  $2 25.00 1 1/28/94
345353  traction control senso  4 Al   $72   0.00 $28 80.00  1/16/94
412344  tractor transmission    1 Ty   $27   5.00  $2 75.00  1/30/94
534523  steering carriage       1 David $7   5.00  $  75.00 1 1/30/93
560000  seat belt               2 Cindy $2   5.00  $  50.00 1 2/16/93
663661  axles                   2 Sue  $21   5.00  $4 30.00 1 2/16/93
747474  steering wheel          1 Roger $3   0.00  $  30.00   2/3/94
746744  CD changer              1 Al   $55   0.00  $5 50.00  2/15/94
787686  mag wheels              4 Gina  $4   0.00  $1 60.00  1/12/94
846262  bucket seat             1 Gina  $7   5.00  $  75.00   2/1/94
876543  pedals                  2 Roger $1   5.00  $  30.00 1 2/26/93
934456  valve stems             4 Cindy      $.10      $.40   2/7/94
982528  frame                   1 Ann  $20   0.00  $2 00.00 1 1/28/94
999999  racing slicks           4 Al   $17   5.00  $7 00.00  12/9/93
                                        301       302    303    304
```

FIG. 3

COUNT.XLS

| column | count |
|--------|-------|
| 1 | 20 |
| 2 | 20 |
| 3 | 20 |
| 4 | 20 |
| 5 | 20 |
| 6 | 20 |
| 7 | 0 |
| 8 | 20 |
| 9 | 20 |
| 10 | 18 |
| 11 | 19 |
| 12 | 18 |
| 13 | 15 |
| 14 | 13 |
| 15 | 13 |
| 16 | 11 |
| 17 | 14 |
| 18 | 11 |
| 19 | 10 |
| 20 | 10 |
| 21 | 6 |
| 22 | 6 |
| 23 | 7 |
| 24 | 6 |
| 25 | 6 |
| 26 | 5 |
| 27 | 5 |
| 28 | 3 |
| 29 | 3 |
| 30 | 1 |
| 31 | 1 |
| 32 | 20 |
| 33 | 0 |
| 34 | 20 |
| 35 | 20 |
| 36 | 14 |
| 37 | 9 |
| 38 | 7 |
| 39 | 10 |
| 40 | 18 |

| column | count |
|--------|-------|
| 41 | 18 |
| 42 | 20 |
| 43 | 20 |
| 44 | 20 |
| 45 | 20 |
| 46 | 0 |
| 47 | 0 |
| 48 | 0 |
| 49 | 0 |
| 50 | 2 |
| 51 | 13 |
| 52 | 18 |
| 53 | 19 |
| 54 | 20 |
| 55 | 20 |
| 56 | 20 |
| 57 | 20 |
| 58 | 0 |
| 59 | 7 |
| 60 | 20 |
| 61 | 20 |
| 62 | 20 |
| 63 | 20 |
| 64 | 20 |
| 65 | 20 |
| 66 | 14 |

*FIG. 8*

| | 0000000<br>1234567 | 00111111112222222233<br>890123456789012345678901 | 33<br>23 | 333333444444<br>456789012345 | 444455555555<br>678901234567 | 55666666666<br>890123456 |
|---|---|---|---|---|---|---|
| | 004234 | control cable (inches) | 115 | Cindy $.05 | $5.75 | 12/6/93 |
| | 121212 | antilock brake units | 4 | Ann $375.00 | $1500.00 | 1/7/94 |
| | 125402 | spoiler | 1 | Roger $50.00 | $500.00 | 2/1/94 |
| | 200009 | 65 hp. engine | 1 | Al $450.00 | $450.00 | 12/27/93 |
| | 221122 | heavy duty bumpers | 2 | Ty $120.00 | $240.00 | 12/2/94 |
| | 234102 | titanium-cone speakers | 4 | Ann $200.00 | $800.00 | 1/7/94 |
| | 284782 | body | 1 | Ann $225.00 | $225.00 | 11/28/94 |
| | 345353 | traction control senso | 4 | Al $720.00 | $2880.00 | 1/16/94 |
| | 412344 | tractor transmission | 1 | Ty $275.00 | $275.00 | 1/30/94 |
| | 534523 | steering carriage | 1 | David $75.00 | $75.00 | 11/30/93 |
| | 560000 | seat belt | 2 | Cindy $25.00 | $50.00 | 12/16/93 |
| | 663661 | axles | 2 | Sue $215.00 | $430.00 | 12/16/93 |
| | 747474 | steering wheel | 1 | Roger $30.00 | $30.00 | 2/3/94 |
| | 746744 | CD changer | 1 | Al $550.00 | $550.00 | 2/15/94 |
| | 787686 | mag wheels | 4 | Gina $40.00 | $160.00 | 1/12/94 |
| | 846262 | bucket seat | 1 | Gina $75.00 | $75.00 | 2/1/94 |
| | 876543 | pedals | 2 | Roger $15.00 | $30.00 | 12/26/93 |
| | 934456 | valve stems | 4 | Cindy $.10 | $.40 | 2/7/94 |
| | 982528 | frame | 1 | Ann $200.00 | $200.00 | 11/28/94 |
| | 999999 | racing slicks | 4 | Al $175.00 | $700.00 | 12/9/93 |

*FIG. 9A*

|  | 0000000<br>1234567 | 0011111111122222222223333<br>8901234567890123456789012 3 | 3333<br>0123 | 333333444444<br>456789012345 | 4444555555555<br>678901234567 | 5566666666<br>890123456 |
|---|---|---|---|---|---|---|
|  | 004234 | control cable (inches) | 115 | Cindy $.05 | $5.75 | 12/6/93 |
|  | 121212 | antilock brake units | 4 | Ann $375.00 | $1500.00 | 1/7/94 |
|  | 125402 | spoiler | 1 | Roger $50.00 | $500.00 | 2/1/94 |
|  | 200009 | 65 hp. engine | 1 | Al $450.00 | $450.00 | 12/27/93 |
|  | 221122 | heavy duty bumpers | 2 | Ty $120.00 | $240.00 | 12/2/94 |
|  | 234102 | titanium-cone speakers | 4 | Ann $200.00 | $800.00 | 1/7/94 |
|  | 284782 | body | 1 | Ann $225.00 | $225.00 | 11/28/94 |
|  | 345353 | traction control senso | 4 | Al $720.00 | $2880.00 | 1/16/94 |
|  | 412344 | tractor transmission | 1 | Ty $275.00 | $275.00 | 1/30/94 |
|  | 534523 | steering carriage | 1 | David $75.00 | $75.00 | 11/30/93 |
|  | 560000 | seat belt | 2 | Cindy $25.00 | $50.00 | 12/16/93 |
|  | 663661 | axles | 2 | Sue $215.00 | $430.00 | 12/16/93 |
|  | 747474 | steering wheel | 1 | Roger $30.00 | $30.00 | 2/3/94 |
|  | 746744 | CD changer | 1 | Al $550.00 | $550.00 | 2/15/94 |
|  | 787686 | mag wheels | 4 | Gina $40.00 | $160.00 | 1/12/94 |
|  | 846262 | bucket seat | 1 | Gina $75.00 | $75.00 | 2/1/94 |
|  | 876543 | pedals | 2 | Roger $15.00 | $30.00 | 12/26/93 |
|  | 934456 | valve stems | 4 | Cindy $.10 | $.40 | 2/7/94 |
|  | 982528 | frame | 1 | Ann $200.00 | $200.00 | 11/28/94 |
|  | 999999 | racing slicks | 4 | Al $175.00 | $700.00 | 12/9/93 |

FIG. 9B

| 0000000<br>1234567 | 00111111111222222222233<br>89012345678901234567890123 | 3333<br>0123 | 33333<br>45678 | 3444444<br>9012345 | 444455555555<br>6789012345667 | 5566666666<br>890123456 |
|---|---|---|---|---|---|---|
| 004234 | control cable (inches) | 115 | Cindy | $.05 | $5.75 | 12/6/93 |
| 121212 | antilock brake units | 4 | Ann | $375.00 | $1500.00 | 1/7/94 |
| 125402 | spoiler | 1 | Roger | $50.00 | $500.00 | 2/1/94 |
| 200009 | 65 hp. engine | 1 | Al | $450.00 | $450.00 | 12/27/93 |
| 221122 | heavy duty bumpers | 2 | Ty | $120.00 | $240.00 | 12/2/94 |
| 234102 | titanium-cone speakers | 4 | Ann | $200.00 | $800.00 | 1/7/94 |
| 284782 | body | 1 | Ann | $225.00 | $225.00 | 11/28/94 |
| 345353 | traction control senso | 4 | Al | $720.00 | $2880.00 | 1/16/94 |
| 412344 | tractor transmission | 1 | Ty | $275.00 | $275.00 | 1/30/94 |
| 534523 | steering carriage | 1 | David | $75.00 | $75.00 | 11/30/93 |
| 560000 | seat belt | 2 | Cindy | $25.00 | $50.00 | 12/16/93 |
| 663661 | axles | 2 | Sue | $215.00 | $430.00 | 12/16/93 |
| 747474 | steering wheel | 1 | Roger | $30.00 | $30.00 | 2/3/94 |
| 746744 | CD changer | 1 | Al | $550.00 | $550.00 | 2/15/94 |
| 787686 | mag wheels | 4 | Gina | $40.00 | $160.00 | 1/12/94 |
| 846262 | bucket seat | 1 | Gina | $75.00 | $75.00 | 2/1/94 |
| 876543 | pedals | 2 | Roger | $15.00 | $30.00 | 12/26/93 |
| 934456 | valve stems | 4 | Cindy | $.10 | $.40 | 2/7/94 |
| 982528 | frame | 1 | Ann | $200.00 | $200.00 | 11/28/94 |
| 999999 | racing slicks | 4 | Al | $175.00 | $700.00 | 12/9/93 |

1001 ──  STK #   DESCRIPTION              QTY MECH  ITM CST  TOTAL COST  DATE REQD
         004234  control cable (inches)  115 Cindy     $.05       $5.75  12/6/93
         121212  antilock brake units      4 Ann    $375.00    $1500.00  1/7/94
         125402  spoiler                   1 Roger   $50.00     $500.00  2/1/94
         200009  65 hp. engine             1 Al     $450.00     $450.00  12/27/93
         221122  heavy duty bumpers        2 Ty     $120.00     $240.00  12/2/94
         234102  titanium-cone speakers    4 Ann    $200.00     $800.00  1/7/94
         284782  body                      1 Ann    $225.00     $225.00  11/28/94
         345353  traction control senso    4 Al     $720.00    $2880.00  1/16/94
         412344  tractor transmission      1 Ty     $275.00     $275.00  1/30/94
         534523  steering carriage         1 David   $75.00      $75.00  11/30/93
         560000  seat belt                 2 Cindy   $25.00      $50.00  12/16/93
         663661  axles                     2 Sue    $215.00     $430.00  12/16/93
         747474  steering wheel            1 Roger   $30.00      $30.00  2/3/94
         746744  CD changer                1 Al     $550.00     $550.00  2/15/94
         787686  mag wheels                4 Gina    $40.00     $160.00  1/12/94
         846262  bucket seat               1 Gina    $75.00      $75.00  2/1/94
         876543  pedals                    2 Roger   $15.00      $30.00  12/26/93
         934456  valve stems               4 Cindy    $.10        $.40   2/7/94
         982528  frame                     1 Ann    $200.00     $200.00  11/28/94
         999999  racing slicks             4 Al     $175.00     $700.00  12/9/93
```

METHOD AND SYSTEM FOR LOCATING FIELD BREAKS WITHIN INPUT DATA

TECHNICAL FIELD

The invention relates generally to a method and system for receiving input data, and more specifically, to a method and system for locating field breaks within input data.

BACKGROUND OF THE INVENTION

Computers are often used to store and process data. Computer users usually use an application program to store a particular kind of data, or to process data in a particular way. A particular type of application program, called a database application, permits users to store and process a body of related data in the form of a table. A table is composed of records, each containing data about a particular thing, such as a mechanical part needed to construct a go-cart. Each record corresponds to one "line" of data, and a line is terminated by an end-of-line character, such as a return or line feed character. Each record is divided into a set of fields, or particular pieces of data. The set of fields is the same for every record in the table. Example fields for part records include part number, part description, and part cost. A record in such table would contain the part number, part description, and part cost for a particular part. Fields usually also have a uniform length, measured in number of characters, in every record.

FIG. 1 is a diagram showing the contents of an example table. The table 100 contains twenty records 101–120, each specifying data for each of seven fields 131–137. The fields are a stock number field 131, a description field 132, a quantity required field 133, a responsible mechanic field 134, an item cost field 135, a total cost field 136, and a date required field 137. In order to construct a go-cart, two axles, stock number 663661, which cost $215 each, are needed by Sue by Dec. 16, 1993, at a total cost of $430.00. Accordingly, the stock number field for record 113 contains the stock number "663661", the description field contains the description "axles", the quantity required field contains the quantity "2", the responsible mechanic field contains the name "Sue", the item cost field contains the item cost "$215.00", the total cost field contains the total cost "$430.00", and the date required field contains the date "12/16/93". These field contents would typically have been stored in the table after being inputted by a user. A user typically positions an insert cursor to a particular field and types the data the field is to contain, then instructs the database application to move the input cursor to another field using a next field key, such as the tab key.

Some database applications store table data in fixed-width field format, in which the contents of every field of each record are stored together in a string of text, and the fields are delineated by absolute position within the string. Text includes alphabetic, numeric and other characters. FIG. 2 is a diagram of the information shown in the table FIG. 1 stored as text strings. The figure shows character position numbers 201, also called column numbers, above the text strings. The first seven characters of each string contains the contents of the stock number field, the eighth through twenty-ninth character contains the contents of the description field, etc. Field width information is often stored separately from the table data, and is therefore sometimes unavailable to other application programs, such as other database applications or spreadsheet applications, when reading the table data.

When a spreadsheet or database application reads a text file containing a table in fixed-width field format for which field width information is not available, it must position field breaks within the table data. Typically, spreadsheet and database applications use one of two methods to position field breaks in such data. In a first manual method, the application program solicits the necessary information from the user, either by interactively inputting the width of each field, or by inputting a control string containing information about every field, including width. This method has the shortcoming that it requires the user to provide width information that is likely both outside of the user's knowledge and difficult to determine manually.

A second single row analysis method automatically analyzes the text in a single record, usually the first, or topmost record. This usually involves positioning a field break at every location at which the analyzed record contains a non-substantive character, such as a space, that follows a substantive character, such as a letter. This method has the shortcoming of often incorrectly positioning field breaks, since a single record is seldom representative of the entire table. FIG. 3 is an example of how the single row analysis method of positioning field breaks would position field breaks in the strings of text shown in FIG. 2. The diagram shows field breaks 301–304. It can be readily seen that, because of idiogyncrasies of the first record, field breaks 302, 303, and 304 have all been positioned improperly: each is positioned within a field, rather than between two fields.

SUMMARY OF THE INVENTION

It is an object of the invention to provide a method and system in a computer system for locating field breaks within input data.

It is another object of the invention to provide a method and system in a computer system for identifying fields within input data.

It is a further object of the invention to provide a method and system in a computer system for positioning field breaks within input data.

These and other objects, which will become apparent as the invention is more fully described below, are provided by a method and system for locating field breaks within input data. In a preferred embodiment, a software facility locates field breaks within input data. The facility first receives input data made of a large number of rows of text. The facility then selects a group of the received rows of text to analyze. The facility identifies field breaks within the input data by analyzing the selected group of rows of text. The facility preferably analyzes the selected rows by counting the number of substantive characters in each column of the selected rows. The facility then uses the count to determine which columns have less than a field-break threshold of substantive characters. The facility locates one field break within each series of columns that have less than the field-break threshold of substantive characters.

BRIEF DESCRIPTION OF THE DRAWINGS

FIG. 1 is a diagram showing the contents of an example table.

FIG. 2 is a diagram of the information shown in the table FIG. 1 stored as text strings.

FIG. 3 is an example of how the single row analysis method of positioning field breaks would position field breaks in the strings of text shown in FIG. 2.

FIG. 8 is a count table showing the values of the Count[] array after the data shown in FIG. 2 is counted.

FIG. 9A is a display image of the preview window that shows the field breaks automatically located by the facility.

FIG. 9B is a display image of the same preview window after the user has used the user interface potion of the facility to correct the position of a field break.

FIG. 9C is a display image of the same preview window after the user has used the user interface potion of the facility to insert a missing field break.

FIG. 10 is a diagram of a table stored as text strings that contains header information.

DETAILED DESCRIPTION OF THE INVENTION

A method and system for locating field breaks within input data is provided. (Locating field breaks is also known as identifying or positioning field breaks.) In a preferred embodiment, a software facility (facility) acquires table data in fixed-width field format (input data), then locates field breaks within the input data by analyzing a group of rows of the input data. The facility selects a group of rows to analyze and counts the number of substantive, or non-space, characters in each character position, or column, of the rows in the group. The facility then uses the count to determine which columns have less than a field-break threshold of substantive characters. The facility locates one field break within each series of columns that have less than the field-break threshold of substantive characters. The facility preferably locates each established field break by first selecting an adjacent group of columns in the series that each has the smallest substantive character count in the series. This group of columns is called a contiguous minimum subset. The facility then tests each column that is adjacent to an end of the minimum subset to see whether text has been justified to that column. If just one of these columns is a justification point, then the facility locates the field break between it and the minimum subset. If neither or both of these columns is a justification point, then the facility locates the column break in the middle of the minimum subset. The facility also includes a user interface for adding, deleting, and repositioning field breaks.

Figure 4:
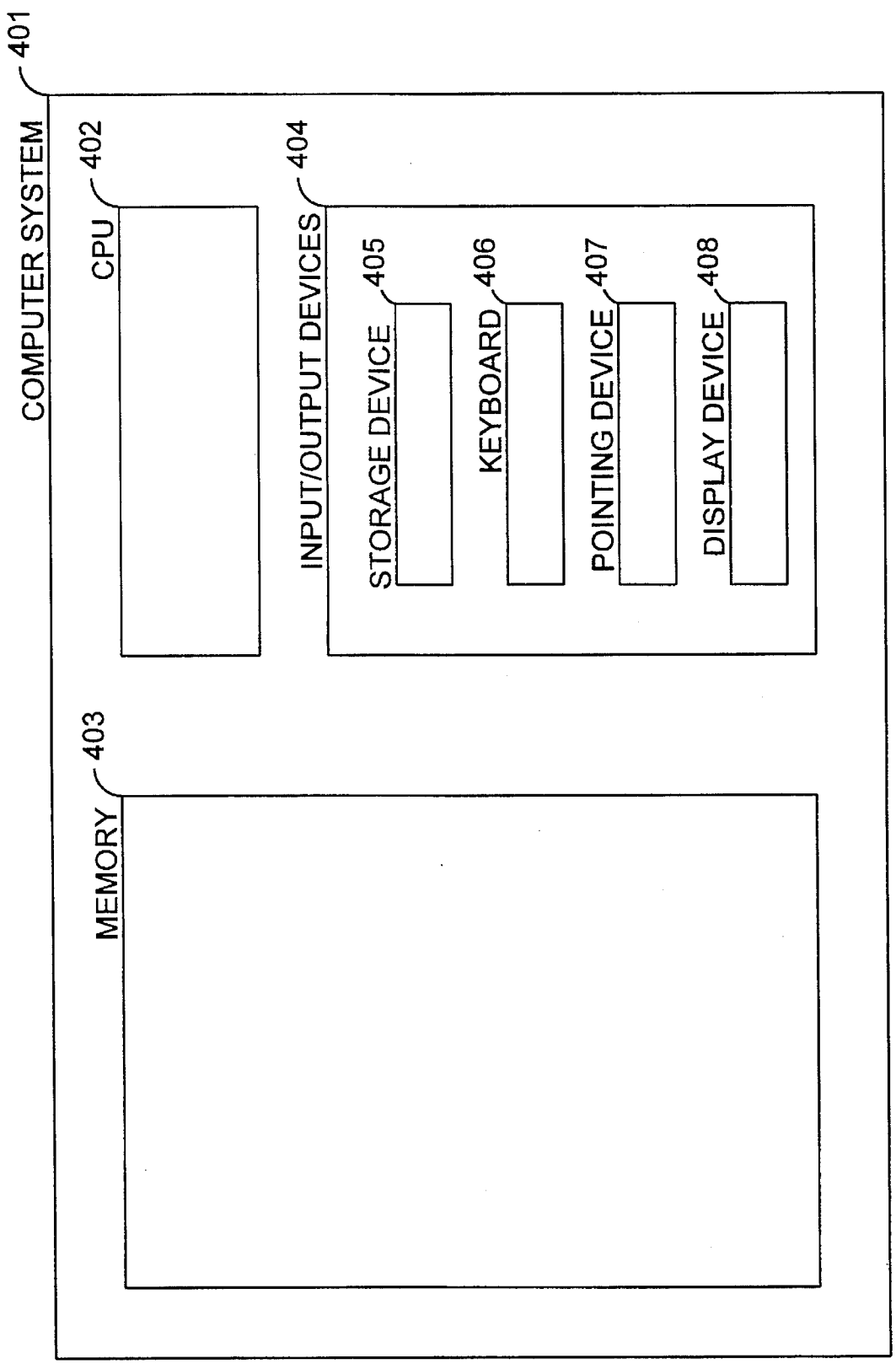
FIG. 4 is a high-level block diagram of the general-purpose computer system upon which the facility preferably operates.

FIG. 4 is a high-level block diagram of the general-purpose computer system upon which the facility preferably operates. The computer system 401 contains a central processing unit (CPU) 402, a computer memory (memory) 403, and input/output devices 404. Among the input/output devices is a storage device 403, such as a hard disk drive, a keyboard 406, a pointing device 407, such as a mouse and a display device, such as a monitor. The computer programs of the facility reside in the memory and execute on the CPU. The user preferably receives visual information from the facility through the monitor and interacts with the user interface portion of the facility using the keyboard or the mouse.

Figure 5:
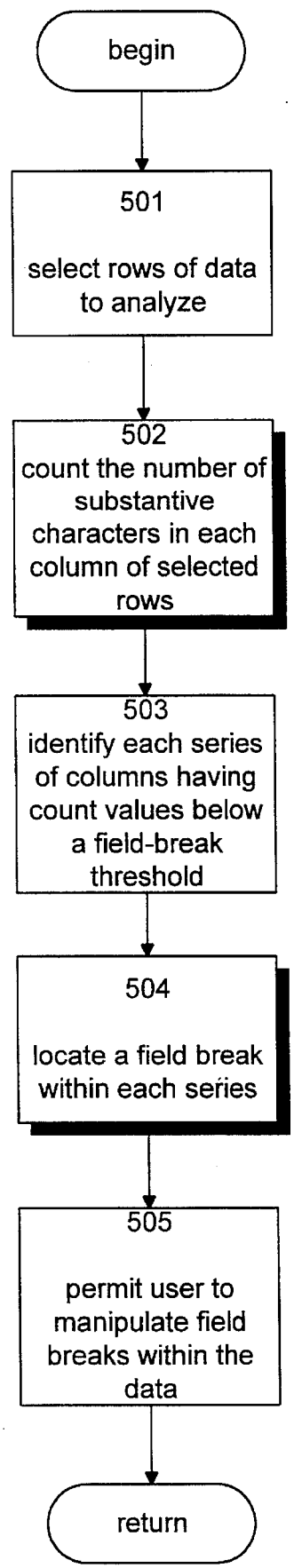
FIG. 5 is an overview flow diagram of the facility.

FIG. 5 is an overview flow diagram of the facility. In step 501, the facility selects a group of the rows that make up the input data to analyze. While the facility selects as large a group of rows as is practicable, it is generally not considered necessary to select more than a few hundred rows. Significant improvements in prior art techniques can be seen even by selecting only a few rows.

In step 502, the facility counts the number of substantive characters in each column of the selected group of rows, storing the counts for all of the columns in a Count[] array. A substantive character is one that is likely part of the data, such as a letter or a numeral. On the other hand, non-substantive characters, also called separator characters, are those that usually are not part of the data, such as spaces, commas, and tab and carriage return characters.

In step 503, the facility identifies columns having count values below a field-break threshold. Contiguous columns meeting this requirement are identified as a series (which may include only one column) and a field break is later located in each series. The field-break threshold is a percentage of the total number of selected rows, whose value is chosen with reference to the amount of field separation expected. The larger the average number of non-substantive characters between fields expected, the lower the field-break threshold may be set, thereby reducing the chance of erroneously locating a field break. Conversely, the smaller the average number of non-substantive characters between fields, the higher the field-break threshold must be set, thereby increasing the chance of erroneously locating a field break. As an example, for ledger-type data like the data shown in FIG. 2, a field-break threshold of 12.5% is preferably chosen. In a preferred embodiment, the facility permits the user to adjust the field-break threshold. For example, a user may know from experience that the facility often inserts extraneous field breaks in input data from a particular source. When processing input data from that source in the future, the user would decrease the field break threshold, thereby reducing the chance of erroneously locating a field break. Each series is preferably stored as a beginning column number and an ending column number. The facility preferably discards any series that begins in the first column or ends in the last column.

In step 504, the facility locates a column breast within each series identified in step 503 by selecting a contiguous minimum subset of the series, then testing for justification points, or columns to which text in each row of text of the input data is aligned, at each end of the series.

In step 505, the facility displays the data in a preview window with the field breaks shown by vertical lines, and permits the user to manipulate the field breaks. The user can reposition a field break by dragging it to a new position, and can delete a field break by double-clicking on it. The user can establish a new field break by clicking on a location in the data where a field break does not exist. A user can also use scroll bars to scroll the table data in both dimensions to observe the affect on his or her changes on all the fields and rows.

Figure 6:
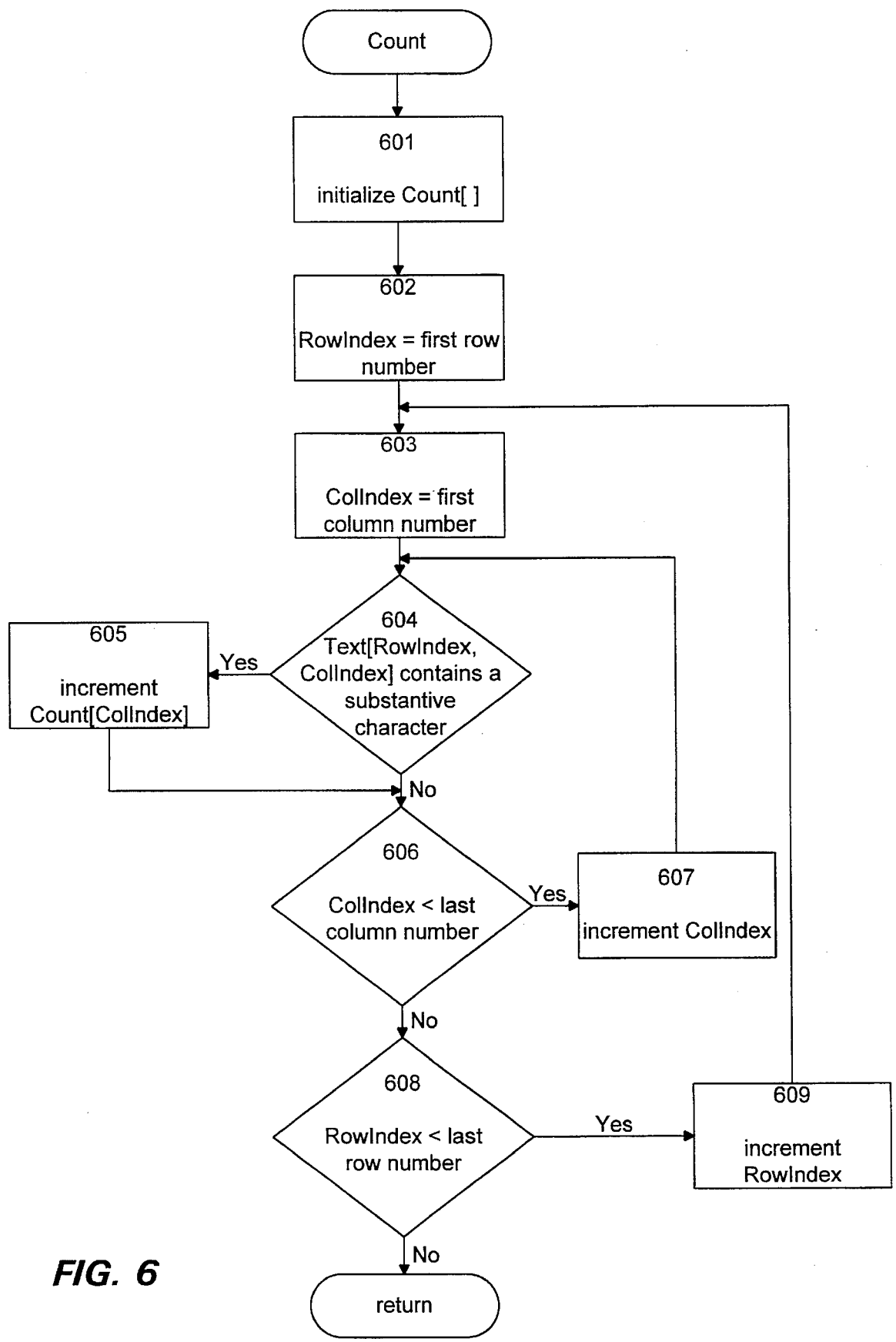
FIG. 6 is a flow diagram depicting the step of counting the number of substantive characters in each column of data in greater detail.

FIG. 6 is a flow diagram depicting the counting step 502 in greater detail. In steps 601–609, the facility initializes a Count[] array indexed by column number, then sets each element equal to the number of selected rows having a substantive character in the corresponding column. In step 601, the facility initializes the Count[] array by setting each of its elements equal to zero. In step 602, the facility sets a RowIndex counter equal to the number of the first selected row. In step 603, the facility sets a ColIndex counter equal to the first column number, preferably 1. In step 604, if the current row and a column of the input data (Text[RowIndex, ColIndex]) contains a substantive character, then the facility increments the count for the current column (Count[ColIndex]) in step 605, else the facility continues at step 606.

In step 607, if the current column counter (ColIndex) is less than the last column number, then the facility increments the current column counter and continues at step 604 to check the next column in the same row, else the facility continues at step 608. In step 608, if the current row counter (RowIndex) is less than the last selected row number, then the facility increments the current row counter and continues at step 603 to check the first column of the next row, else the steps shown in FIG. 6 conclude.

Figure 7:
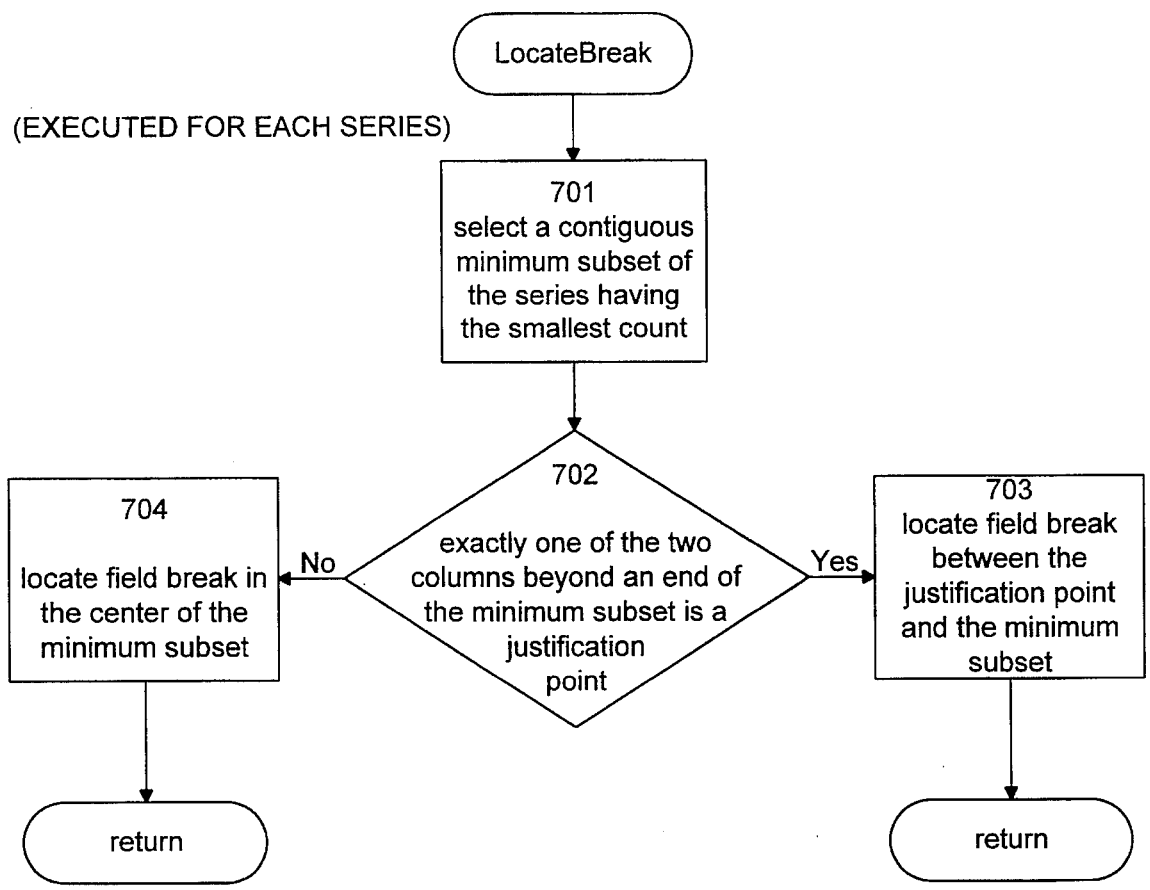
FIG. 7 is a flow diagram depicting the step of locating a field break within each series of columns having count values below a field-break threshold in greater detail.

FIG. 7 is a flow diagram depicting the locating step 504 in greater detail. In steps 701–704, the facility locates a column break within each series identified in step 503 by selecting a contiguous minimum subset of the series, then testing for justification points at each end of the minimum subset. These steps are executed for each series identified in step 503. In step 701, the facility selects a contiguous minimum subset is preferably stored as a beginning column value and an ending column value.

In steps 702–704, the facility locates a column break either just beyond one of the ends of these contiguous minimum subsets selected in step 503, or as near to the center of the selected contiguous minimum subset as possible. The contiguous minimum subset corresponds roughly to empty columns between two fields. If a single one of the two columns is justified on the side of the blank columns, then it is most effective to locate the field break at that end of the contiguous minimum subset. On the other hand, if neither field is justified to the side of the blank columns, or they both are, then it is most effective to position the field break in the center of the contiguous minimum subset. In step 702, if exactly one of the two columns beyond an end of the contiguous minimum subset is a justification point, then the facility continues at step 703 to locate the field break between the single justification point and the contiguous minimum subset, else the facility continues at step 704 to locate the field break in the center of the contiguous minimum subset. The facility determines whether a column is a justification point by comparing its count to a justification threshold. The justification threshold, like the field-break threshold, is a percentage of the total number of selected rows, whose value is chosen with reference to the type of data expected. A justification threshold of 50% is preferably chosen for most data. In a preferred embodiment, the facility permits the user to adjust the justification threshold. For example, the user may know from experience that, when processing input from a particular source, the facility tends to erroneously detect justification points in the input data. When receiving input data in the future from the same source, the user would reduce the justification threshold to reduce the likelihood of erroneously recognizing justification points. The facility then repeats steps 701–704 for any remaining series.

The following example illustrates the operation of the facility. FIG. 8 is a count table showing the values of the Count[] array after step 502 is executed for the data shown in FIG. 2. The lines of count table 800 each contain a column number and a count value. The count value for each line indicates the number of substantive (here, non-space) characters appearing in the numbered column. For example, the count table shows that column 10 (of FIG. 2) has a count value of 18, which is equal to the number of substantive characters in column 10. Because the sample data has 20 rows, with a 12.5% field-break threshold, the nominal field-break threshold is 2.5. The count values are compared to the field break threshold in step 503, and contiguous columns having count values below the field break threshold are grouped into series. The first series in the sample data are from column 30 to column 31, from column 33 to column 33, from column 46 to column 50, and from column 58 to column 58. As an example of selecting a contiguous minimum subset in the series that begins with column 46 and ends with column 50, in step 504, the facility selects the contiguous minimum subset of column 46 to column 49, which has a count value of 0.

The contiguous minimum subset for column 46 to column 49 is preceded by column 45, which has a count of 20, and followed by column 50, which has a count of 2. The justification threshold for the sample data is 10 (assuming a justification threshold of 50%), which is exceeded by the count of column 45, but not by the count of column 50. Because a facility recognizes a single justification point, it executes step 703 to locate the field break between the minimum subset (column 49) and the justification point (column 50).

FIG. 9A is a display image of the preview window that shows the field breaks automatically located by the facility. The facility displays the preview window 900 as the visual interface for the preview mode supported by the facility in step 505. The preview window contains a portion of the table data 901, and the position of each field break is shown in the data as vertical bars 902–906. The user can use scroll bars 907 and 908 to scroll the table data in both dimensions to observe the effect of his or her changes on all of the fields and rows.

It can be seen in FIG. 9A that the facility has mispositioned field break 903. FIG. 9B is a display image of the same preview window after the user has used the user interface portion of the facility to correct the position of field break 903. The user uses the mouse to position the mouse cursor over field break 903 in its initial position, presses a button on the mouse, uses the mouse to move the mouse cursor, as well as the field break, to its destination position, and releases the button. The facility interprets these actions by the user as a field break move command and moves the field break between columns 31 and 32 to between columns 29 and 30.

It can be seen in FIG. 9B that the facility has also failed to locate a field break between the responsible mechanic field and the item cost field. FIG. 9C is a display image of the same preview window after the user has used the user interface portion of the facility to insert a missing field break between these fields. The user uses the mouse to position the mouse cursor between columns 38 and 39 and presses a button on the mouse. The facility interprets these actions by the user as a field break add command and locates a field break between columns 38 and 39.

The facility has further features that enhance its effectiveness. In a preferred embodiment, the facility detects when it has located a field break inside a field organized in one of several common data formats that incorporates non-substantive characters, such as spaces. As an example, some data formats specify that parts of the data are separated by spaces, such as the representation "Aug 3 1993" for Aug. 3, 1993. The facility preferably maintains a table of such formats, which include various time ("12:30 PM") and currency ("3,500,00 fr.") formats, as well as date formats, and compares them to consecutive pairs of fields in the selected rows of input data. When the facility locates a pair of fields that together comply with the format, it removes the field break separating them.

When the input data contains a large number of rows, in step 501, the facility preferably skips, or omits, rows containing header information, which is often formatted differently than actual data. FIG. 10 is a diagram of a table stored as text strings that contains header information. In the data 1000 shown in FIG. 10, first row 1001 contains header information and should be omitted. In a preferred embodiment, the facility skips any rows at the beginning of the input data that contain obviously different formatting than the main records of the input data. In an alternate embodiment, the facility merely skips the first several rows of data, using the heuristic that most header information usually occurs in the first few rows of data.

It can be difficult to identify a field break between a first field that is left justified and a second field that is right justified, because, while the fields are often separated by non-substantive characters in individual rows, the counts for the columns on either side of the intended field break often average out to nearly the same value. The field break between the responsible mechanic field 134 and the item cost field 135 in the sample data is an example of this situation. It can be seen from the count table that the last column of the responsible mechanic field (38) contains seven substantive characters, while the first column of the item cost field (39) contains ten substantive characters. Since neither one of these values is below the nominal field-break threshold of 2.5 characters, the facility would not normally identify a series between these fields, and would therefore normally not locate a field break between them. The facility is preferably able to generate a multiple-column count to address this difficulty. When the facility recognizes it, the facility increments the multiple-column count for a given column once for each row in which both the current column and the next column both contain a substantive character. The multiple-column count is then analyzed in the same way as the single-column count described above. Use of a multiple column count is effective to recognize a field break between the responsible mechanic field and the item cost field.

It can also be difficult to identify a field break between two fields that are separated by few or no non-substantive characters. However, in a preferred embodiment, the facility is able to identify a field break between a first field containing mostly letters and a second field containing mostly numerals. In this embodiment, the facility produces two separate counts: one in which only letters are considered substantive characters, and one in which only numerals are considered substantive characters. The facility then compares the two counts to identify columns at which one count drops off quickly and the other increases abruptly, and inserts additional field breaks at this column.

While this invention has been shown and described with reference to preferred embodiments, it will be understood by those skilled in the art that various changes or modifications in form and detail may be made without departing from the scope of the invention. For example, an aesthetically different user interface portion could be used to receive field break manipulation commands from the user. Further, the count values could be analyzed differently. For example, more than one count value at a time could be compared to relative thresholds. Also, more sophisticated forms of statistical analysis could be applied to the count values.

We claim:

1. A method in a computer system for locating field breaks within input data, the method comprising the steps of:

receiving input data comprising a multiplicity of rows of data, the multiplicity of rows of data having ordered columns, each containing a character that may be either substantive or non-substantive;

selecting every row of data of the multiplicity of rows of data; and identifying field breaks within the input data by analyzing the selected rows of data, comprising the substeps of:
counting the number of substantive characters in each column of the selected rows of data, wherein a count value is produced for each column, and wherein the count values are ordered to correspond to the order of the columns; and
identifying field breaks within the input data based upon the count values for one or more of the columns.

2. A method in a computer system for locating field breaks within input data, the method comprising the steps of:

receiving input data comprising a multiplicity of rows of data;

selecting a plurality of the multiplicity of rows of data, the selected rows of data having ordered columns, each containing a character that may be either substantive or non-substantive; and identifying field breaks within the input data by analyzing the selected rows of data, comprising the substeps of:
counting the number of substantive characters in each column of the selected rows of data, wherein a count value is produced for each column, and
identifying field breaks within the input data based upon the count values for one or more of the columns.

3. The method of claim 2 wherein the plurality of rows of data is ordered, such that one of the rows of data is the top row of data, and wherein the selecting step includes the step of omitting a contiguous group of one or more rows of data that includes the top row of data.

4. The method of claim 2 wherein the count values are ordered to correspond to the order of the columns, and wherein the rows of data include header rows that contain header information for describing the contents of other rows of data, and wherein the selecting step includes the step of omitting the header rows.

5. The method of claim 2 wherein the step of identifying field breaks within the input data based upon the count values includes the steps of:

identifying one or more series of columns for which the count values are below a field-break threshold: and locating a field break within each series of columns identified.

6. The method of claim 5 wherein the step of identifying one or more series of columns for which the count values are below a field-break threshold includes the step of omitting a series of columns for which the count values that are below the field-break threshold that appears in the order of the columns before the first column for which the count value is greater than the field-break threshold.

7. The method of claim 5 wherein the input data may contain one or more justification points, each of which is a column within the input data to which data in each row of data of the input data is aligned, and wherein the locating step includes the steps of, for each series of columns:

selecting a contiguous minimum subset of the series of columns, such that the contiguous minimum subset of the series of columns have counts that are generally not larger than any of the series of columns not within the contiguous minimum subset of the series of series of columns:

determining whether zero, one, or two of the two count values that are immediately adjacent to the contiguous minimum subset of the series of columns are justification points within the input data;

if one of the columns that is immediately contiguous to the contiguous minimum subset of the series of columns is a justification point, locating the field break between the column that is a justification point and the contiguous minimum subset of the series of columns; and if zero or two of the count values that are immediately contiguous to the contiguous minimum subset of the series of columns are justification points, locating the field break within the contiguous minimum subset of the series off columns.

8. The method of claim 7 wherein the step of, if zero or two of the count values that are immediately contiguous to the contiguous minimum subset of the series of columns are justification points, locating the field break within the contiguous minimum subset of the series of columns locates the field break as near to the center of the contiguous minimum subset of the series of columns as is possible.

9. The method of claim 7 wherein the step of determining whether zero, one, or two of the two count values that are immediately adjacent to the contiguous minimum subset of the series of columns are justification points includes the steps of:

determining whether the count value for the column immediately preceding the first column of the contiguous minimum subset of the series of columns exceeds a justification threshold; and determining whether the count value for the column immediately following the last column of the contiguous minimum subset of the series of columns exceeds the justification threshold.

10. The method of claim 5 wherein the input data contains data organized in one of a predefined multiplicity of data formats, a plurality of the data formats specifying organizing the data using non-substantive characters, further including the steps of, after the step of locating a field break:

recognizing that a field break has been located within a field containing data organized in a data format specifying organizing the data using nonsubstantive characters; and removing the field break recognized in the recognizing step.

11. A method in a computer system for locating field breaks within input data, the method comprising the receiving input data comprising a multiplicity of rows of data;

selecting a plurality of the multiplicity of rows of data, the selected rows of data having ordered columns, each containing a character that may either be non-substantive or substantive; and identifying field breaks within the input data by analyzing the selected rows of data, including the substeps of:

for each column, counting the number of selected rows in which there is a substantive character in both the column and in an adjacent column, and identifying field breaks within the input data based upon the count values produced by the counting step.

12. A method in a computer system for locating field breaks within input data, the method comprising the steps of:

receiving input data comprising a multiplicity of rows of data, the multiplicity of rows of data being ordered, such that one of the rows of data is the top row of data;

selecting a plurality of the multiplicity of rows of data such that a contiguous group of one or more rows of data that includes the top row of data are not among the selected rows of data; and identifying field breaks within the input data by analyzing the selected rows of data.

13. A method in a computer system for locating field breaks within input data, the method comprising the steps of:

receiving input data comprising a multiplicity of rows of data, the rows of data including header rows that contain header information for describing the contents of other rows of data;

selecting a plurality of the multiplicity of rows of data, such that the header rows are not among the selected rows of data; and identifying field breaks within the input data by analyzing the selected rows of data.

14. A method in a computer system for identifying fields within input data, the method comprising the steps of:

receiving input data comprising a multiplicity of rows of text, the rows of text having ordered columns, each containing a character that may be either substantive or non-substantive;

selecting a plurality of the multiplicity of rows of text;

counting the number of substantive characters contained in a first predefined group of characters in each column of the selected rows of text, such that a first character group count value is produced for each column, and such that the first character group values are ordered to correspond to the order of the columns;

counting the number of substantive characters contained in a second predefined group of characters in each column of the selected rows of text, such that a second character group count value is produced for each column, and such that the second character group count values are ordered to correspond to the order of the columns; and identifying fields within the input data based upon the first character group count values and second character group count values produced by the counting steps.

15. The method of claim 14 wherein the first predefined group of characters and the second predefined group of characters are mutually exclusive, and wherein the step of counting the number of substantive characters contained in a first predefined group of characters in each column of the selected rows of text counts only characters not counted by the step of counting the number of substantive characters contained in a second predefined group of characters in each column of the selected rows of text.

16. The method of claim 15 wherein some characters are letters, and wherein the first predefined group of characters contains letters and the second predefined group of characters contains non-letters, and wherein the step of counting the number of substantive characters contained in a second predefined group of characters in each column of the selected rows of text counts only nonletters.

17. The method of claim 15 wherein some characters are numerals, and wherein the first predefined group of characters contains numerals and the second predefined group of characters contains non-numerals, and wherein the step of counting the number of substantive characters contained in a second predefined group of characters in each column of the selected rows of text counts only nonnumerals.

18. A method in a computer system for positioning field breaks within input data, the method comprising the steps of:

receiving input data comprising a multiplicity of rows of text;

selecting a plurality of the multiplicity of rows of text;

identifying field breaks within the input data by analyzing the selected rows of text, each field break having a horizontal position in the input data at which a new field begins in each row of text, thereby specifying for each field a portion of text in each row that is contained in the field; and manipulating directly the field breaks positioned in the identifying step in response to receiving input from a user to change at least one of the horizontal positions in the input data at which a new field begins in each row of text, thereby specifying that a subportion of text in each row that was formerly contained in a selected field is contained in a field adjacent to the selected field.

19. The method of claim 18 wherein the manipulating step includes the steps of:

receiving a relocate instruction from the user; and relocating a field break identified in the identifying step in response to receiving the relocate instruction from the user.

20. The method of claim 19 wherein the step of receiving a relocate instruction from the user includes the step of receiving an indication of which field break to relocate and an indication of the position to which to relocate the field break, and wherein the relocating step relocates the field break in accordance with the indications.

21. The method of claim 18 wherein the manipulating step includes the steps of:

receiving a delete instruction from the user; and deleting a field break identified in the identifying step in response to receiving the delete instruction from the user.

22. The method of claim 21 wherein the step of receiving a delete instruction from the user includes the step of receiving an indication of which field break to delete, and wherein the deleting step deletes the field break in accordance with the indication.

23. The method of claim 18 wherein the manipulating step includes the steps of:

receiving an add instruction from the user; and adding a field break to those identified in the identifying step in response to receiving the add instruction from the user.

24. The method of claim 23 wherein the step of receiving an add instruction from the user includes the step of receiving an indication of the position at which a field break is to be added, and wherein the adding step adds the field break at the position indicated by the indication.

25. A method in a computer system for acquiring and interpreting rows of data, the method comprising the steps of:

inputting a multiplicity of rows of data in which a field break separating a first field of data in the rows from a second field of data in the rows is implicit;

identifying the field break in the multiplicity of rows of data by analyzing a plurality of the rows of data;

displaying a row of data so that the first field of data of the displayed row of data is separated from the second field of data of the displayed row which is separated from the second field of data by the identified field break is visually separated from the second field of data of the displayed row;

after the displaying step, receiving from a user a move field break command specifying a new position for the field break;

in response to the move field break command, directly changing the position of the field break to the position specified in the move field break command; and redisplaying the displayed row of data so that the first field of data which is separated from the second field of data by the moved field break is visually separated from the second field of data.

26. A computer-based field-break locator for identifying fields within input data, the input data having rows of fields, each field having characters, the rows of the input data being logically divided into one-character columns, each character being either substantive or non-substantive, comprising:

a receiver for receiving the input data;

a selector for selecting a plurality of rows of the received input data; and an analyzer for identifying the fields within the input data based on the selected rows, itself comprising:

a counter for determining the number of non-substantive characters in each column of the selected rows of the input data, a counter memory for storing the number of non-substantive characters in each column of the selected rows of the input data, and a field break positioner for positioning a field break at a column proximate to a column having a relative minimum of non-substantive characters with respect to surrounding columns.

27. The field break locator of claim 26 wherein the field break positioner includes a data justification detector for detecting whether data in columns adjacent to the column having the smallest number of non-substantive characters is justified to the columns adjacent to the column having the smallest number of non-substantive characters, and wherein the field break positioner positions the field break based upon the results realized by the detector.

28. A computer-based field-break locator tier identifying fields within input data, the input data having rows of fields, each field having characters, one or more rows of the input data containing header information for identifying portions of the remainder of the rows of data, comprising:

a receiver for receiving the input data;

a selector for selecting a plurality of rows of the received input data, the selector including a discriminator tier detecting and omitting one or more rows of data containing header information; and an analyzer for identifying the fields within the input data based on the selected rows.

29. The method of claim 19 wherein the computer system has a pointing device, and wherein the step of receiving a relocate instruction from the user includes the step of receiving an indication that the user used the pointing device to drag an identified field break from its original position within the input data to a new position within the input data, and wherein the relocating step includes the step of relocating the identified field break to the new position within the input data.

30. A computer-readable medium containing data causing a computer system to locate field breaks within input data by performing the steps of:

receiving input data comprising a multiplicity of rows of data;

selecting a plurality of the multiplicity of rows of data, the selected rows of data having ordered columns, each containing a character that may be either substantive or non-substantive; and identifying field breaks within the input data by analyzing the selected rows of data, comprising the substeps of:

counting the number of substantive characters in each column of the selected rows of data, wherein a count value is produced for each column, and identifying field breaks within the input data based upon the count values for one or more of the columns.

31. The computer-readable medium of claim 30 wherein the plurality of rows of data is ordered, such that one of the rows of data is the top row of data, and wherein the selecting step includes the step of omitting a contiguous group of one or more rows of data that includes the top row of data.

32. The computer-readable medium of claim 30 wherein the count values are ordered to correspond to the order of the columns, and wherein the rows of data include header rows that contain header information for describing the contents of other rows of data, and wherein the selecting step includes the step of omitting the header rows.

33. The computer-readable medium of claim 30 wherein the step of identifying field breaks within the input data based upon the count values includes the steps of:

identifying one or more series of columns for which the count values are below a field-break threshold; and locating a field break within each series of columns identified.

34. The computer-readable medium of claim 33 wherein the step of identifying one or more series of columns for which the count values are below a field-break threshold includes the step of omitting a series of columns for which the count values that are below the field-break threshold that appears in the order of the columns before the first column for which the count value is greater than the field-break threshold.

35. The computer-readable medium of claim 33 wherein the input data may contain one or more justification points, each of which is a column within the input data to which data in each row of data of the input data is aligned, and wherein the locating step includes the steps of, for each series of columns:

selecting a contiguous minimum subset of the series of columns, such that the contiguous minimum subset of the series of columns have counts that are generally not larger than any of the series of columns not within the contiguous minimum subset of the series of series of columns;

determining whether zero, one, or two of the two count values that are lo immediately adjacent to the contiguous minimum subset of the series of columns are justification points within the input data;

if one of the columns that is immediately contiguous to the contiguous minimum subset of the series of columns is a justification point, locating the field break between the column that is a justification point and the contiguous minimum subset of the series of columns; and if zero or two of the count values that are immediately contiguous to the contiguous minimum subset of the series of columns are justification points, locating the field break within the contiguous minimum subset of the series off columns.

36. The computer-readable medium of claim 35 wherein the step of, if zero or two of the count values that are immediately contiguous to the contiguous minimum subset of the series of columns are justification points, locating the field break within the contiguous minimum subset of the series of columns locates the field break as near to the center of the contiguous minimum subset of the series of columns as is possible.

37. The computer-readable medium of claim 35 wherein the step of determining whether zero, one, or two of the two count values that are immediately adjacent to the contiguous minimum subset of the series of columns are justification points includes the steps of:

determining whether the count value for the column immediately preceding the first column of the contiguous minimum subset of the series of columns exceeds a justification threshold; and determining whether the count value for the column immediately following the last column of the contiguous minimum subset of the series of columns exceeds the justification threshold.

38. A computer-readable medium containing data causing a computer system to locate field breaks within input data by performing the steps of:

receiving input data comprising a multiplicity of rows of text;

selecting a plurality of the multiplicity of rows of text;

identifying field breaks within the input data by analyzing the selected rows of text, each field break having a horizontal position in the input data at which a new field begins in each row of text, thereby specifying for each field a portion of text in each row that is contained in a field; and manipulating directly the field breaks positioned in the identifying step in response to receiving input from a user to change at least one of the horizontal positions in the input data at which a new field begins in each row of text, thereby specifying that a subportion of text in each row that was formerly contained in a selected field is contained in a field adjacent to the selected field.

39. The method of claim 38 wherein the manipulating step includes the steps of:

receiving a relocate instruction from the user; and relocating a field break identified in the identifying step in response to receiving the relocate instruction from the user.

40. The method of claim 38 wherein the manipulating step includes the steps of:

receiving a delete instruction from the user; and deleting a field break identified in the identifying step in response to receiving the delete instruction from the user.

41. The method of claim 38 wherein the manipulating step includes the steps of:

receiving an add instruction from the user; and adding a field break to those identified in the identifying step in response to receiving the add instruction from the user.

* * * * *

UNITED STATES PATENT AND TRADEMARK OFFICE
CERTIFICATE OF CORRECTION

PATENT NO. : 5,566,068
DATED : October 15, 1996
INVENTOR(S) : Ross W. Comer and Cynthia A. Solomon It is certified that error appears in the above-indentified patent and that said Letters Patent is hereby corrected as shown below:

In column 8, claim 1, line 13, please delete ";" and insert therefor --,--.

In column 9, claim 11, line 51, following the second instance of "the" please insert --steps of:--.

In column 12, claim 28, line 39, please delete "tier" and insert therfor --for--.

In column 12, claim 28, line 46, please delete "tier" and insert therefor --for--.

In column 13, claim 35, line 51, please delete "lo".

Signed and Sealed this

First Day of April, 1997

*Attest:*

*Attesting Officer*

BRUCE LEHMAN

*Commissioner of Patents and Trademarks*